United States Patent
Himuro et al.

(10) Patent No.: US 8,681,264 B2
(45) Date of Patent: Mar. 25, 2014

(54) IMAGING SYSTEM INCLUDING A BODY UNIT TO WHICH A LENS UNIT OR AN EXTERNAL UNIT IS MOUNTED

(75) Inventors: Keiji Himuro, Yokohama (JP); Noriaki Ojima, Yokohama (JP); Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 242 days.

(21) Appl. No.: 12/909,301

(22) Filed: Oct. 21, 2010

(65) Prior Publication Data

US 2011/0109789 A1 May 12, 2011

(30) Foreign Application Priority Data

Nov. 6, 2009 (JP) ................................ 2009-254799

(51) Int. Cl.
*H04N 5/225* (2006.01)
*G03B 17/48* (2006.01)

(52) U.S. Cl.
USPC .......................................... 348/360; 396/429

(58) Field of Classification Search
USPC ........... 348/207.2, 211.14, 360; 396/429, 430
See application file for complete search history.

(56) References Cited

U.S. PATENT DOCUMENTS

| | | | | |
|---|---|---|---|---|
| 5,895,127 A | * | 4/1999 | Yamamoto | 396/30 |
| 6,167,208 A | * | 12/2000 | Sato | 396/532 |
| 6,490,419 B2 | * | 12/2002 | Teramoto | 396/321 |
| 7,042,499 B1 | * | 5/2006 | Kido et al. | 348/211.14 |
| 7,636,518 B2 | * | 12/2009 | Tanaka et al. | 396/56 |
| 7,649,550 B2 | * | 1/2010 | Ishiyama et al. | 348/211.14 |
| 2005/0253930 A1 | * | 11/2005 | Endo et al. | 348/207.1 |
| 2006/0033816 A1 | * | 2/2006 | Chang | 348/207.99 |
| 2006/0109349 A1 | * | 5/2006 | Takashima | 348/207.1 |
| 2009/0091628 A1 | * | 4/2009 | Narusawa et al. | 348/207.2 |
| 2011/0102618 A1 | | 5/2011 | Yamaya | |

FOREIGN PATENT DOCUMENTS

| | | |
|---|---|---|
| JP | 6-350888 | 12/1994 |
| JP | 11-142935 | 5/1999 |
| JP | 2000-92358 | 3/2000 |
| JP | 2006-237809 | 9/2006 |
| JP | 2010-177980 | 8/2010 |
| JP | 2011-87242 | 4/2011 |

OTHER PUBLICATIONS

Office Action issued Jul. 2, 2013 in Japanese Patent Application No. 2009-254799.

* cited by examiner

*Primary Examiner* — John Villecco
(74) *Attorney, Agent, or Firm* — Oblon, Spivak, McClelland, Maier & Neustadt, L.L.P.

(57) ABSTRACT

An imaging system includes: a body unit; at least one type of interchangeable lens unit; and at least one type of external unit, wherein in the case where the body unit and one of the at least one type of interchangeable lens unit are connected integrally, the imaging system becomes an imaging device capable of shooting a photographic subject, and in the case where the body unit and one of the at least one type of external unit are connected integrally, the imaging system becomes a device having a specific function of the external unit connected to the body unit, and wherein when the interchangeable lens unit or the external unit is connected to the body unit, the body unit obtains information on the type of unit connected to the body unit, and is capable of changing control of an entire device including the body unit and the unit connected to the body unit based on the type of unit connected to the body unit.

11 Claims, 14 Drawing Sheets

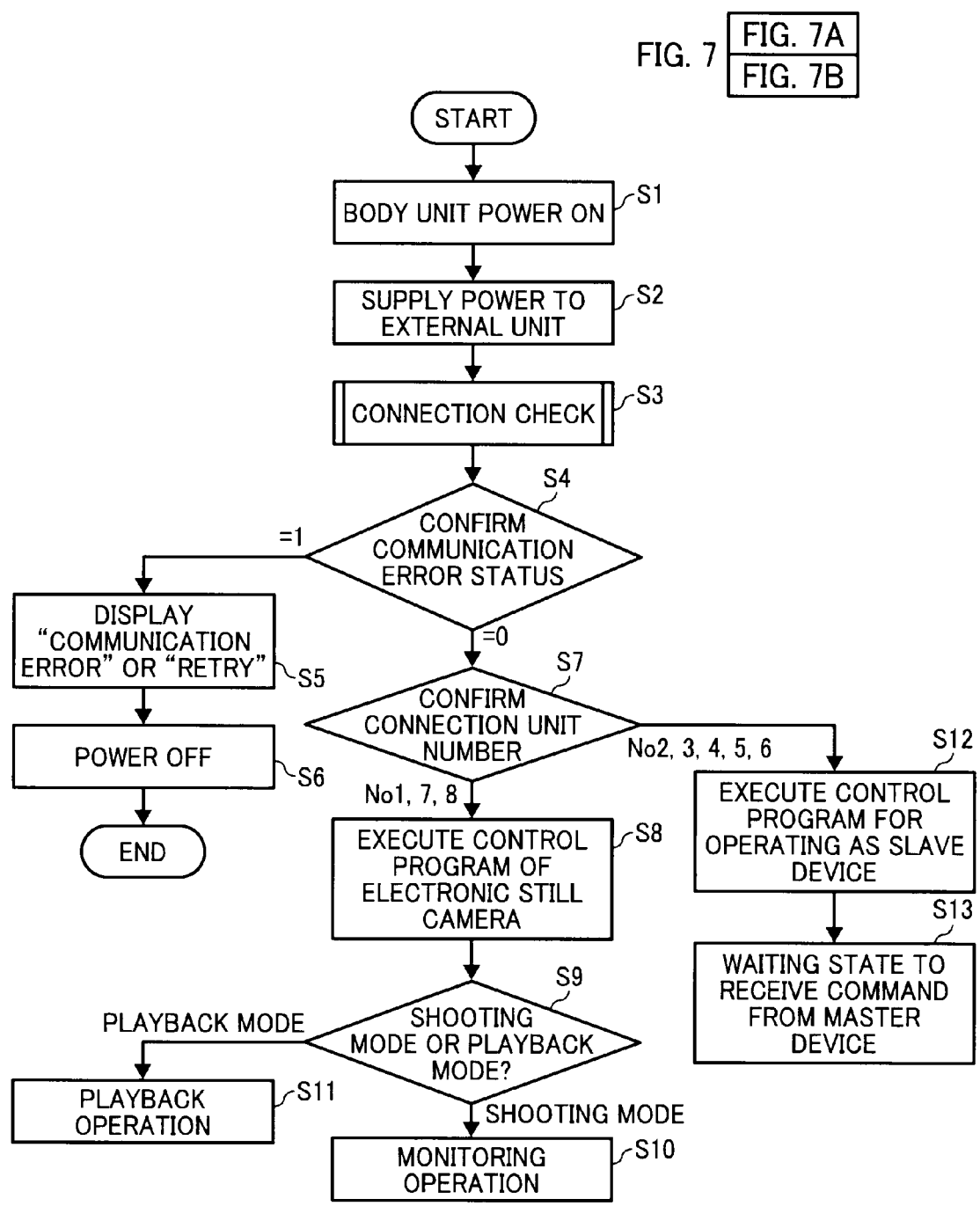

FIG. 7B

TABLE OF CONNECTION UNIT NUMBER

| CONNECTION UNIT NUMBER | CONNECTION UNIT NAME |
|---|---|
| No.1 | INTERCHANGEABLE LENS UNIT |
| No.2 | MEMORY UNIT |
| No.3 | PRINTER UNIT |
| No.4 | PROJECTOR UNIT |
| No.5 | GPS UNIT |
| No.6 | SCANNER UNIT |
| No.7 | WIRELESS UNIT |
| No.8 | ADAPTOR UNIT |

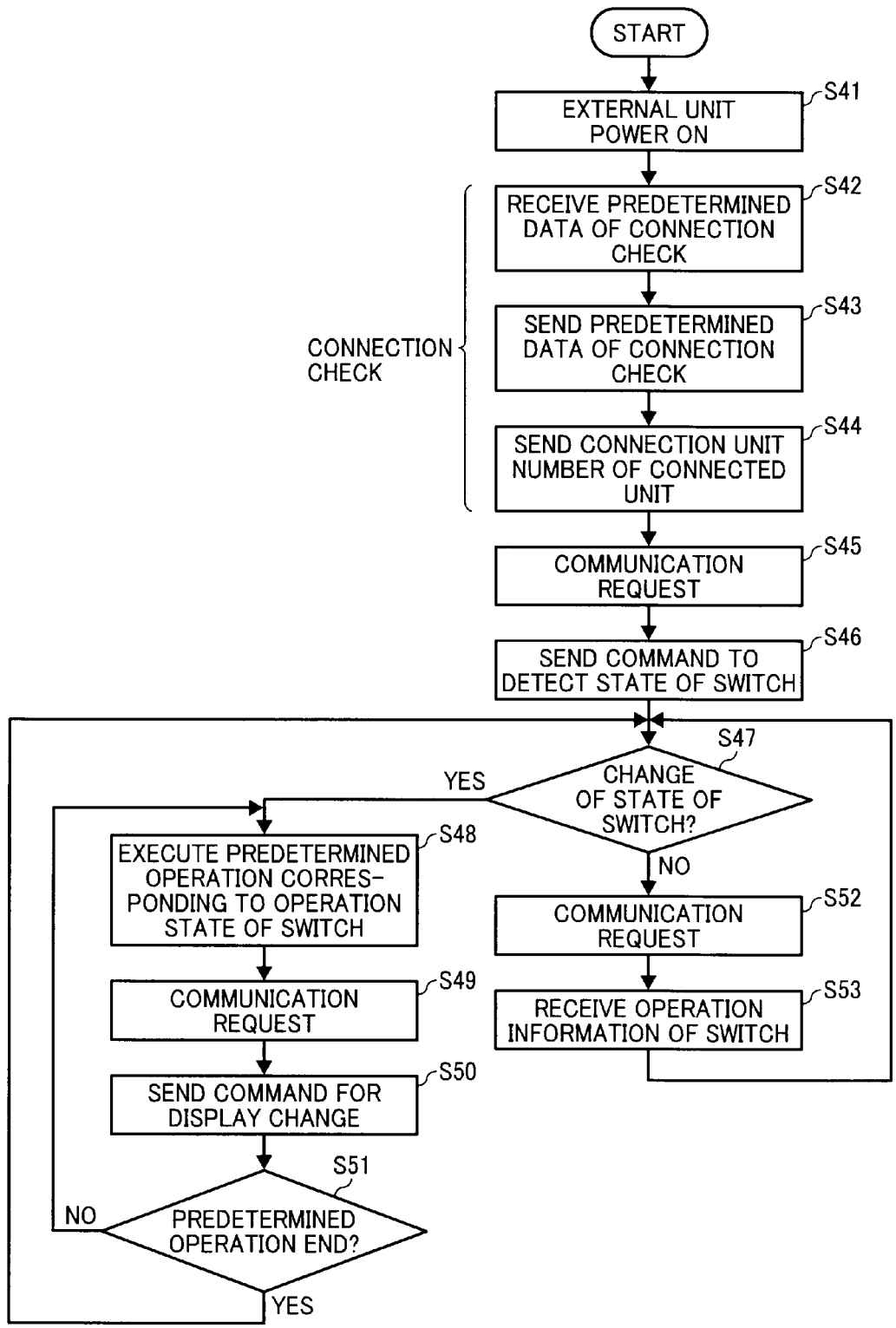

IMAGING SYSTEM INCLUDING A BODY UNIT TO WHICH A LENS UNIT OR AN EXTERNAL UNIT IS MOUNTED

CROSS REFERENCE TO RELATED APPLICATIONS

The present application is based on and claims priority from Japanese patent application number 2009-254799, filed Nov. 6, 2009, the disclosure of which is hereby incorporated by reference herein in its entirety.

BACKGROUND

The present invention relates to an imaging system including a body unit, at least one type of interchangeable lens unit, and at least one type of external unit.

The external unit has specific functions such as a printer function, a scanner function, and the like.

In the case where the body unit and one of the at least one type of interchangeable lens unit are connected integrally, the imaging system becomes an imaging device capable of shooting a photographic subject, and in the case where the body unit and one of the at least one type of external unit are connected integrally, the imaging system becomes a device having a specific function of the connected external unit.

As a method of transferring image data of an image shot by a digital camera (electronic still camera) to a PC (personal computer) or a printer, a general method is that the camera and the PC, or the camera and the printer are connected by cables for transferring the image data.

For example, Japanese patent application publication number H06-350888 discloses an electronic still camera which connects with a label printer by cables when sending image data to the label printer.

Additionally, Japanese patent application publication number 2000-92358 discloses a camera system in which an external connection device has a mount part configured similarly to a mount part of a lens side of a single-lens reflex digital camera, and when a body part of the single-lens reflex digital camera and the external connection device are connected, the body part and the external connection device are mechanically and electrically connected via the mount part of the external connection device, and the camera system becomes a device having a specific function of the connected external device.

However, in a connection method by cables as disclosed in Japanese patent application publication number H06-350888, the electronic still camera and the label printer are not organized in one place in the case of communication, and therefore space is needed as a whole, usability is not satisfactory, and additionally the appearance is not satisfactory because of the cables.

And in Japanese patent application publication number 2000-92358, not only a main control program in order that the body part implements a function as a camera, but also a control program for implementing a function of an arbitrary external connection device are needed to be installed in the body part.

Therefore, even though a user uses the camera system disclosed in Japanese patent application publication number 2000-92358 only as a camera, and does not need to buy or use the external connection device, a large memory capacity for storing a control program of the external connection device is still needed for a memory in the body part, and accordingly there is a problem in that the installation cost of the body part may increase disadvantageously.

SUMMARY

Therefore, an object of the present invention is to provide an imaging system, which is capable of effectively executing a function of an external unit in the case where a body unit and the external unit are connected, and is compact and user-friendly, and has an excellent appearance. And additionally, another object of the present invention is to provide the imaging system in which a cost balance of each unit constituting the imaging system is appropriate.

In order to achieve the above objects, the embodiment of the present invention provides: an imaging system comprising: a body unit; at least one type of interchangeable lens unit; and at least one type of external unit, wherein in the case where the body unit and one of the at least one type of interchangeable lens unit are connected integrally, the imaging system becomes an imaging device capable of shooting a photographic subject, and in the case where the body unit and one of the at least one type of external unit are connected integrally, the imaging system becomes a device having a specific function of the external unit connected to the body unit, and wherein when the interchangeable lens unit or the external unit is connected to the body unit, the body unit obtains information on the type of unit connected to the body unit, and is capable of changing control of an entire device including the body unit and the unit connected to the body unit based on the type of unit connected to the body unit.

BRIEF DESCRIPTION OF THE DRAWINGS

FIG. 7 is a flowchart illustrating an operation of the body unit regarding a change of a master control in the embodiment.

FIG. 10 is a flowchart illustrating an operation of the external unit connecting to the body unit in the embodiment.

DETAILED DESCRIPTION OF THE PREFERRED EMBODIMENT

Figure 1A:
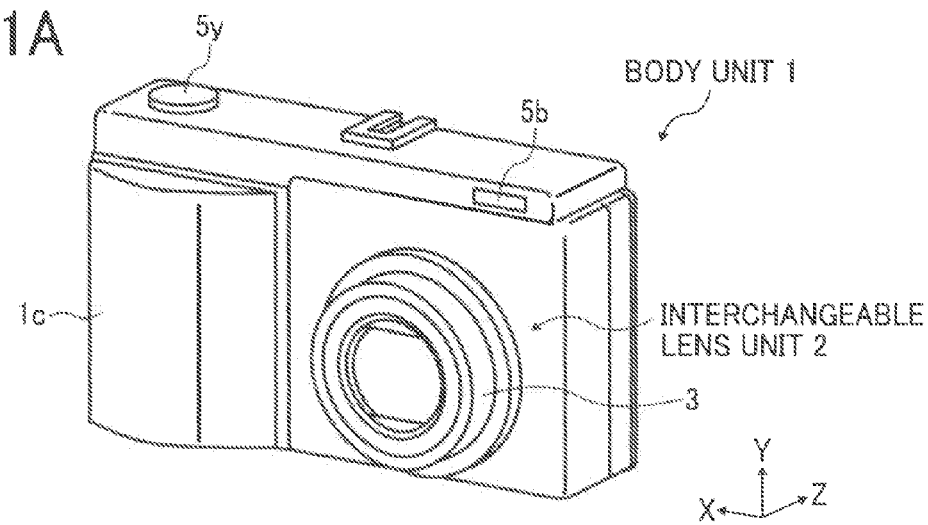
FIG. 1A is a perspective view of an imaging system in an embodiment of the present invention seen from the front and illustrates a state where an interchangeable lens unit is connected to a body unit.

Hereinafter, referring to the drawings, an embodiment of the present invention will be explained.

Figure 1B:
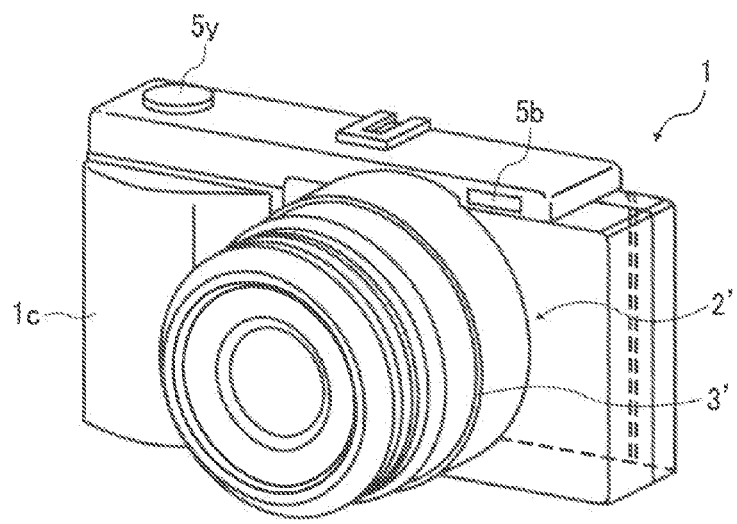
FIG. 1B is a perspective view of the imaging system in the embodiment of the present invention seen from the front and illustrates a state where another interchangeable lens unit is connected to the body unit.
Figure 1C:
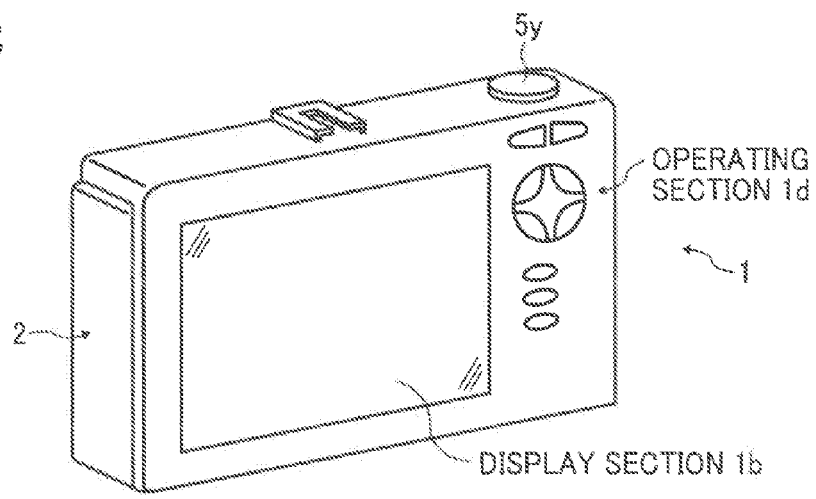
FIG. 1C is a perspective view of the body unit of the imaging system in the embodiment of the present invention seen from the back.

FIGS. 1A to 1C are perspective views of an imaging system in the embodiment of the present invention.

Each of FIGS. 1A and 1B is a perspective view seen from the front illustrating a state where a different interchangeable lens unit is connected to a body unit.

FIG. 1C is a perspective view of the body unit seen from the back.

Figure 2:
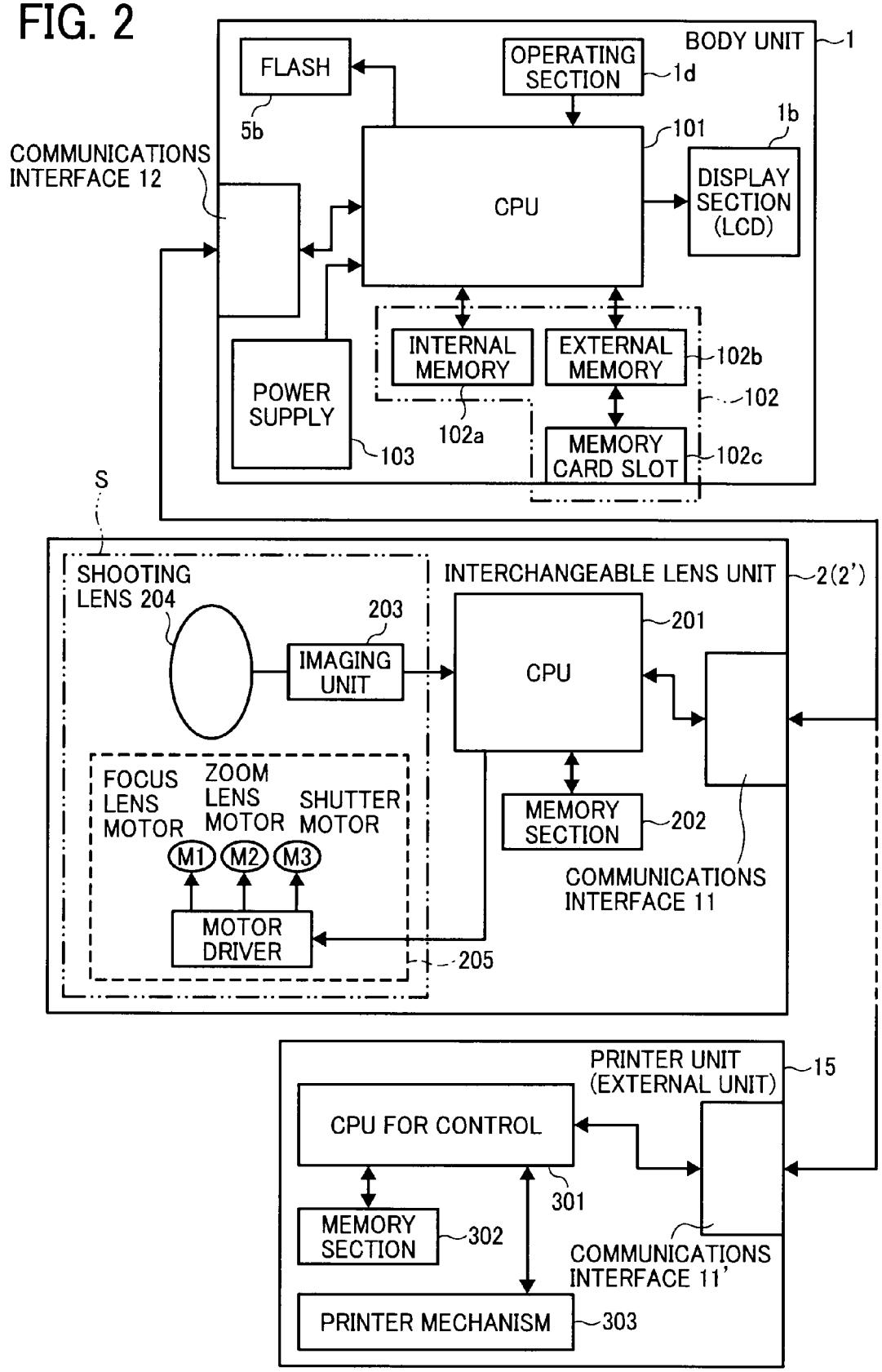
FIG. 2 is a block diagram of the body unit, the interchangeable lens unit, and an external unit (printer unit) of the imaging system in the embodiment.

FIG. 2 is a block diagram of the imaging system, in which reference number 1 denotes a body unit, reference number 2 (2') denotes an interchangeable lens unit, and reference number 15 denotes a printer unit (a unit with a printer function) as an external unit.

The imaging system according to the embodiment includes the body unit 1, at least one type of interchangeable lens unit including the interchangeable lens unit 2 (2'), and at least one type of external unit including the printer unit 15.

As illustrated in FIG. 2, in place of the interchangeable lens unit 2, the interchangeable lens unit 2', the printer unit 15 as the external unit, or the like is capable of being integrally connected to the body unit 1.

In the case where the body unit 1 and one of the at least one type of interchangeable lens unit are connected, the imaging system according to the embodiment becomes an imaging device capable of shooting a photographic subject, and in the case where the body unit 1 and one of the at least one type of external unit are connected, the imaging system according to the embodiment becomes a device having a specific function of the connected external unit.

The body unit 1 has a CPU (central processing unit) 101 as a first controller, an operating section 1d, a display section 1b, a memory section 102 as a first memory section, a communications interface 12 as a first communications section, a flash 5b, and a power supply 103.

The operating section 1d detects an input operation by a user. The display section 1b is capable of displaying an image expressed by processed image data. The memory section 102 is capable of storing program data and image data. The communications interface 12 transfers information including image data between the body unit 1 and the interchangeable lens unit 2 (2') connected to the body unit 1, or between the body unit 1 and the printer unit 15 as the external unit connected to the body unit 1.

The CPU 101 is capable of processing image data, and also capable of controlling the imaging system according to the embodiment of the present invention.

The interchangeable lens unit 2 (2') has an imaging section S, a CPU 201 as a second controller, a memory section 202 as a second memory section, and a communications interface 11 as a second communications section.

The imaging section S images a photographic subject and converts it to image data. The CPU 201 is capable of processing image data. The communications interface 11 transfers information including the processed image data between the body unit 1 and the interchangeable lens unit 2 (2').

The printer unit 15 has a printer mechanism 303 as a function section, a CPU 301 for control as a third controller, a memory section 302 as a third memory section, and a communications interface 11' as a third communications section.

The printer mechanism 303 has a printer function. The CPU 301 for control is capable of controlling the imaging system according to the embodiment of the present invention. The memory section 302 stores program data for implementing the printer function of the printer unit 15. The communications interface 11' transfers information between the body unit 1 and the printer unit 15. The communications interface 11' as the third communications section is similar to the communications interface 11 as the second communications section.

As additional external units, for example, there are a scanner unit which reads an image of a business card and so on, an external memory unit as an external memory with a large capacity, a projector unit which projects and displays an image on a screen and so on, a GPS (global positioning system) unit which obtains position information of the GPS, an interface unit for connecting with a peripheral device, a wireless waterproof camera unit, an adaptor unit for connecting a special optical system such as a fiberscope, and so on.

In the case where the interchangeable lens unit 2 (2') or a unit for image shooting is connected to the body unit 1, the body unit 1 is a master control of an electronic still camera, and an entire device including the body unit 1 and the unit connected to the body unit 1 operates as an electronic still camera.

That is, in this case, the body unit 1 serves a role of a master device which controls an entire device according to the embodiment of the present invention.

Hereinafter, a case where the interchangeable lens unit 2 (2') is connected to the body unit 1 will be explained (see FIG. 2).

In this case, the CPU 101 of the body unit 1 controls an entire electronic still camera.

As illustrated in FIG. 2, the memory section 102 includes an internal memory 102a, an external memory 102b, and a memory card slot 102c. In the case where a memory card is inserted in the memory card slot 102c, a memory area of the memory card is also used.

Imaged data and the like are temporarily stored in the internal memory 102a, and imaged data and the like are ultimately stored in the external memory 102b and the memory card inserted in the memory card slot 102c.

The operating section 1d includes a shutter release switch, a menu switch, a mode selection switch for selecting an operation mode of the entire device according to the embodiment, a data input-output switch for inputting and outputting data, and so on, which are not illustrated.

The display section 1b includes an LCD (liquid crystal display) for display and a touchscreen. The touchscreen serves a part of a function of the operating section 1d.

The operating section 1d, the display section 1b, the flash 5b, the internal memory 102a, the external memory 102b, the memory card inserted in the memory card slot 102c, the communications interface 12 and so on are connected directly or indirectly to the CPU 101, and controlled by the CPU 101.

In addition, the body unit 1 has a flash ROM (flash memory), which is not illustrated, and a program for performing image processing and operation control processing is stored in the flash ROM.

In accordance with the program, the CPU 101 uses a RAM (not illustrated) which is a work area for executing the program, and executes the image processing and the operation control processing.

The body unit 1 additionally has an audio codec, a microphone, a speaker, and so on, which are not illustrated, and thereby the body unit 1 is capable of audio recording and playback.

In a shooting mode of the electronic still camera as the entire device, image data of a photographic subject imaged by the imaging section S is sent to the body unit 1 via the communications interface 11 of the interchangeable lens unit 2 (2') and the communications interface 12, and an image expressed by this image data is displayed on the display section 1b by the CPU 101 (a monitoring (live-preview) display state).

And a focusing operation is performed by operating a shutter release button 5y and when a shooting operation is performed, the shot image is displayed on the display section 1b for a certain time by the CPU 101.

The imaging section S of the interchangeable lens unit 2 (2') includes a shooting lens 204, an optical system driver 205, and an imaging unit 203.

The shooting lens 204 has lens groups including a focus lens and the like. The optical system driver 205 including a motor driver and so on drives the lens groups, and thereby zooming and focusing are performed.

The imaging unit 203 includes an image sensor, and an AFE (analog front end) processor.

The image sensor receives light from the photographic subject via the shooting lens 204, and converts an image of the photographic subject formed by the received light to an analog image signal.

The analog image signal is sent to the AFE processor, and the AFE processor converts the analog image signal to a digital image signal.

The digital image signal is sent to a CPU 201, and in the CPU 201, predetermined image processing such as a YUV data conversion, a JPEG compression, a RAW data production, or the like is performed on the digital image signal.

The CPU 201 is a so-called digital image processor.

Between the CPU 201 and the communications interface 11, there is a two-way bus which transfers image data and a control signal.

Between the communications interface 11 of the interchangeable lens unit 2 (2') and the communications interface 12 of the body unit 1, image data, a control signal, and the like are transferred by a serial interface signal.

The shooting lens 204 has a mechanism of extending and collapsing a lens barrel 3 (3'), which is not illustrated, and control of the mechanism of extension and collapse is performed by a control signal from the body unit 1.

When the power of the body unit 1 is on, the lens barrel 3 (3') is controlled to be extended, and when the power of the body unit 1 is off, the lens barrel 3 (3') is controlled to be collapsed.

Additionally, control of zooming of the shooting lens 204 and the like are also performed by a control signal from the body unit 1.

In addition, the power for the interchangeable lens unit 2 (2') is supplied from the connected body unit 1.

The interchangeable lens unit 2 (2') has a DC-DC converter, which is not illustrated. The DC-DC converter produces voltages with a plurality of voltage values necessary for operations of the interchangeable lens unit 2 (2') from a voltage with one voltage value supplied by the body unit 1.

The DC-DC converter is controlled by an exclusive sub-microcomputer.

In a flash ROM which is the memory section 202 of the interchangeable lens unit 2 (2'), a program for performing image processing and operation control processing is stored.

In accordance with the program, the CPU 201 uses a RAM (not illustrated) as a work area for executing the program, and executes the image processing and the operation control processing.

Next, a method of connection of the body unit 1 and the interchangeable lens unit 2 (2') will be explained.

Figure 3A:
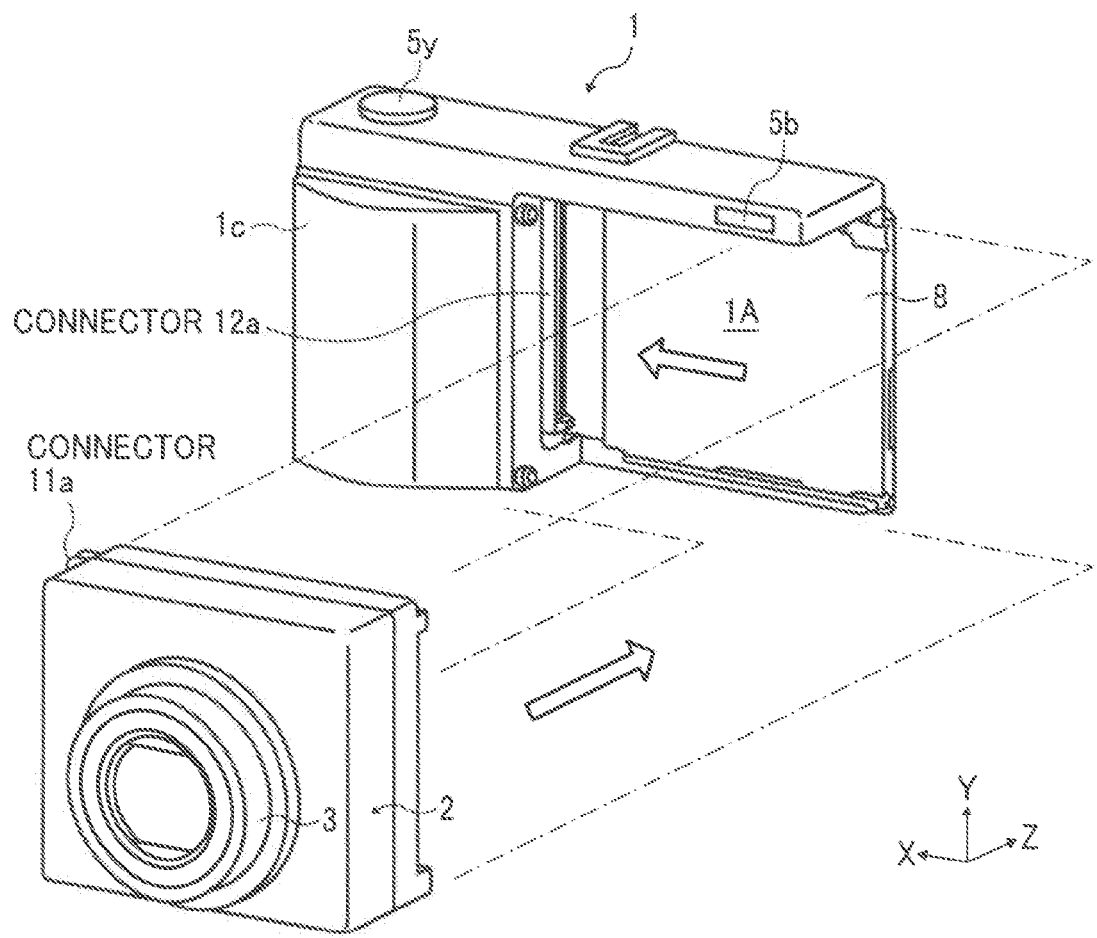
FIG. 3A is a perspective view seen from the front illustrating a connection state of the interchangeable lens unit illustrated in FIG. 1A of the imaging system in the embodiment.
Figure 3B:
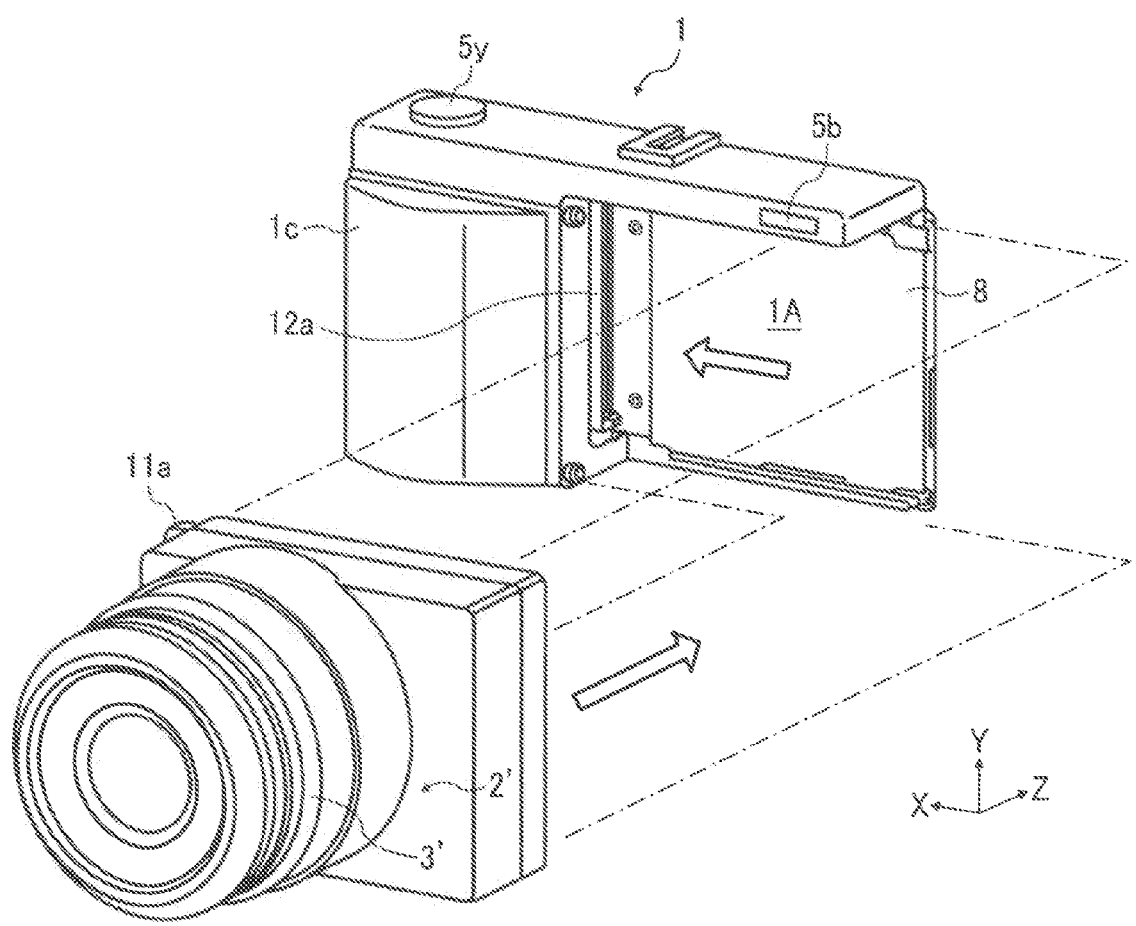
FIG. 3B is a perspective view seen from the front illustrating a connection state of the interchangeable lens unit illustrated in FIG. 1B of the imaging system in the embodiment.

As illustrated in FIGS. 3A and 3B, a connector 11a of the communications interface 11 is provided in a front end part in an X direction of the drawing of the interchangeable lens unit 2 (2'), and a connector 12a of the communications interface 12 is provided in a back end face in the X direction of the drawing of a grip part 1c of the body unit 1.

Firstly, as illustrated in FIGS. 3A and 3B, the interchangeable lens unit 2 (2') is moved in a Z direction, which is illustrated by an arrow in the drawing, to contact a back end wall 8 of the body unit 1. After the interchangeable lens unit 2 (2') contacts the body unit 1, the interchangeable lens unit 2 (2') is slid in the X direction, which is illustrated by an arrow in the drawing.

And when the connector 11a and the connector 12a are fitted, the body unit 1 and the interchangeable lens unit 2 (2') are electrically connected and also mechanically connected at the same time.

And then, when the body unit 1 is operated and the power is on, the body unit 1 and the interchangeable lens unit 2 (2') become integrated, and the entire device according to the embodiment operates as the electronic still camera as the imaging device.

Figure 4A:
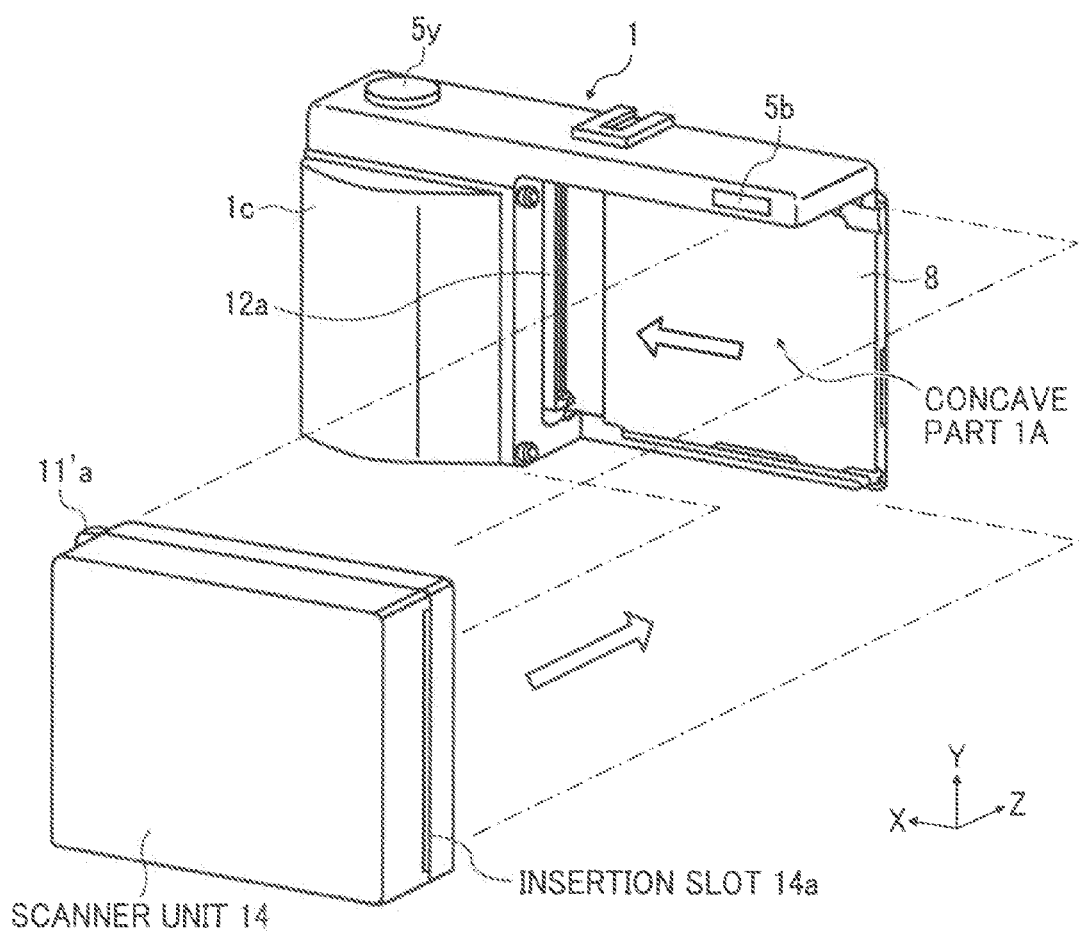
FIG. 4A is a perspective view illustrating a connection state of a scanner unit of the imaging system in the embodiment.

And as illustrated in FIG. 4A, in place of the interchangeable lens unit 2 (2'), when a scanner unit 14 as an external unit is connected to the body unit 1, a master control of an entire device including the body unit 1 and the scanner unit 14 as the external unit connected to the body unit 1 is changed to the scanner unit 14, and the body unit 1 operates as an input-output device (display section 1b, operating section 1d) for supporting a function of the connected scanner unit 14. That is, the body unit 1 becomes a slave device of the connected scanner unit 14.

For example, in the case where the scanner unit 14 illustrated in FIG. 4A is a business card reader, a business card is inserted into an insertion slot 14a of the scanner unit 14, and the card is optically read by pressing a switch of the operating section 1d, and then an image of the read card is stored in the external memory 102b of the body unit 1 illustrated in FIG. 2 and so on.

Figure 4B:
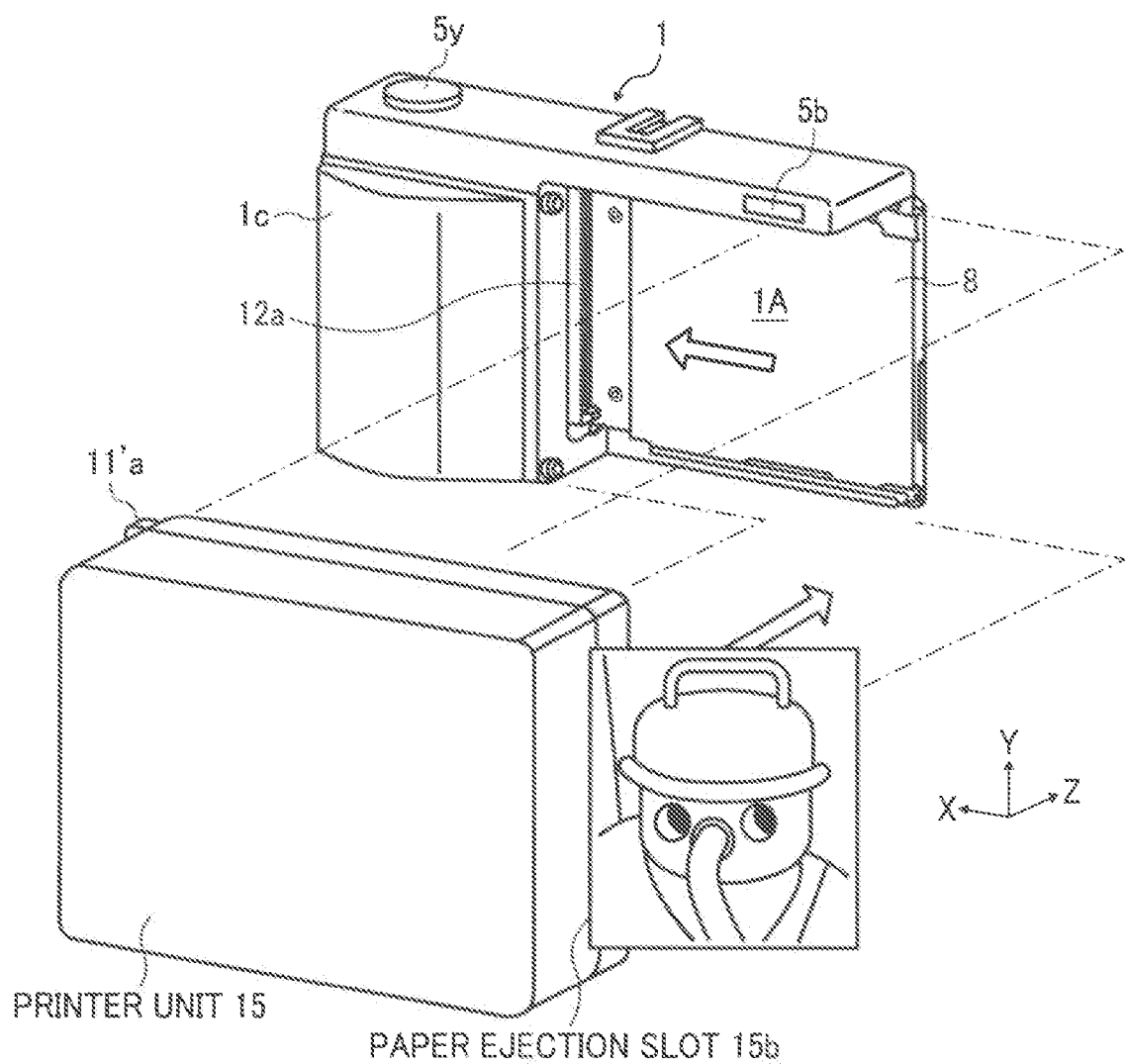
FIG. 4B is a perspective view illustrating a connection state of a printer unit of the imaging system in the embodiment.

And additionally, as illustrated in FIG. 4B, in place of the interchangeable lens unit 2 (2'), when a printer unit 15 as an external unit is connected to the body unit 1, a master control of an entire device including the body unit 1 and the printer unit 15 as the external unit connected to the body unit 1 is changed to the printer unit 15 in the same way as the scanner unit 14, and the body unit 1 operates as an input-output device (display section 1b, operating section 1d) for supporting a function of the connected printer unit 15. That is, the body unit 1 becomes a slave device of the connected printer unit 15.

That is, the body unit 1 detects a change of a pressed state of the operating section 1d (operation switches), and sends information of the pressed state to the printer unit 15 via the communications interfaces 11' and 12.

And the body unit 1 receives a control command from the CPU 301 for control of the printer unit 15 via the communications interfaces 11' and 12, and based on the received control command, displays contents expressed by data on the display section 1b (LCD), writes data to be stored in the external memory 102b, and reads out data from the external memory 102b and sends it to the printer unit 15.

Thus, the body unit 1 serves a function of a user interface of the external unit and a function as an adaptor for accessing the external memory 102*b* and so on.

The body unit 1 changes a role assigned to each operation switch constituting the operating section 1*d* depending on each specific function of the interchangeable lens unit 2 (2') connected to the body unit 1 or the external unit connected to the body unit 1.

Additionally, the body unit 1 uses a touchscreen function of the display section 1*b*, displays switch icons for performing a specific operation of the connected external unit, detects an operation state of the switch icons, and sends the operation state to the external unit.

Therefore, in the entire device according to the embodiment, it is possible to operate and instruct a special function which is not assigned to the switches constituting the operating section 1*d*. (See FIG. 5)

In this case, contents displayed on the display section 1*b* are instructed to the body unit 1 by the control command from the CPU 301 for control of the external unit.

A role of the operating section 1*d* (operation switches) in the case where the body unit 1 operates as a slave device, unlike the case of working as the electronic still camera, is determined by each external unit (master device) connected to the body unit 1.

In the case where the interchangeable lens unit 2' illustrated in FIG. 3B or the printer unit 15 illustrated in FIG. 4B is connected to the body unit 1, the interchangeable lens unit 2' or the printer unit 15 protrudes greatly in − (negative) X, −Y, and −Z directions in the drawing from an end part of the body unit 1, compared to the interchangeable lens unit 2 or the scanner unit 14.

Thus, in the imaging system according to the embodiment of the present invention, one corner of the interchangeable lens unit 2 (2') or one corner of each of the at least one type of the external unit, and a concave part 1A of the body unit 1 are fitted, and therefore the size of the interchangeable lens unit 2 (2') or the size of each external unit is unlimited.

Here, an operation of changing the master control by a connection to the body unit 1 will be explained.

Each of the external units for image shooting such as the interchangeable lens unit 2 (2'), the wireless waterproof camera unit, the adaptor unit and the like has a communications interface for connecting with the body unit 1, and a communications protocol followed by each communications interface is common to a communications protocol followed by the body unit 1.

Firstly, the body unit 1, in accordance with the communications protocol, performs a connection check between the body unit 1 and the external unit, a confirmation of a unit number of the external unit, and so on.

In the imaging system according to the embodiment of the present invention, in the case where an external unit with a shooting function such as the interchangeable lens unit 2 (2'), the wireless waterproof camera unit, the adaptor unit and the like is connected to the body unit 1, the external unit (with the shooting function) operates as a slave device of the electronic still camera, and the body unit 1 operates as a master device.

That is, these external units perform a shooting operation, an AF operation, an AE operation, an image processing operation, and so on based on the command received from the body unit 1, and send shot and processed image data to the body unit 1.

Figure 6A:
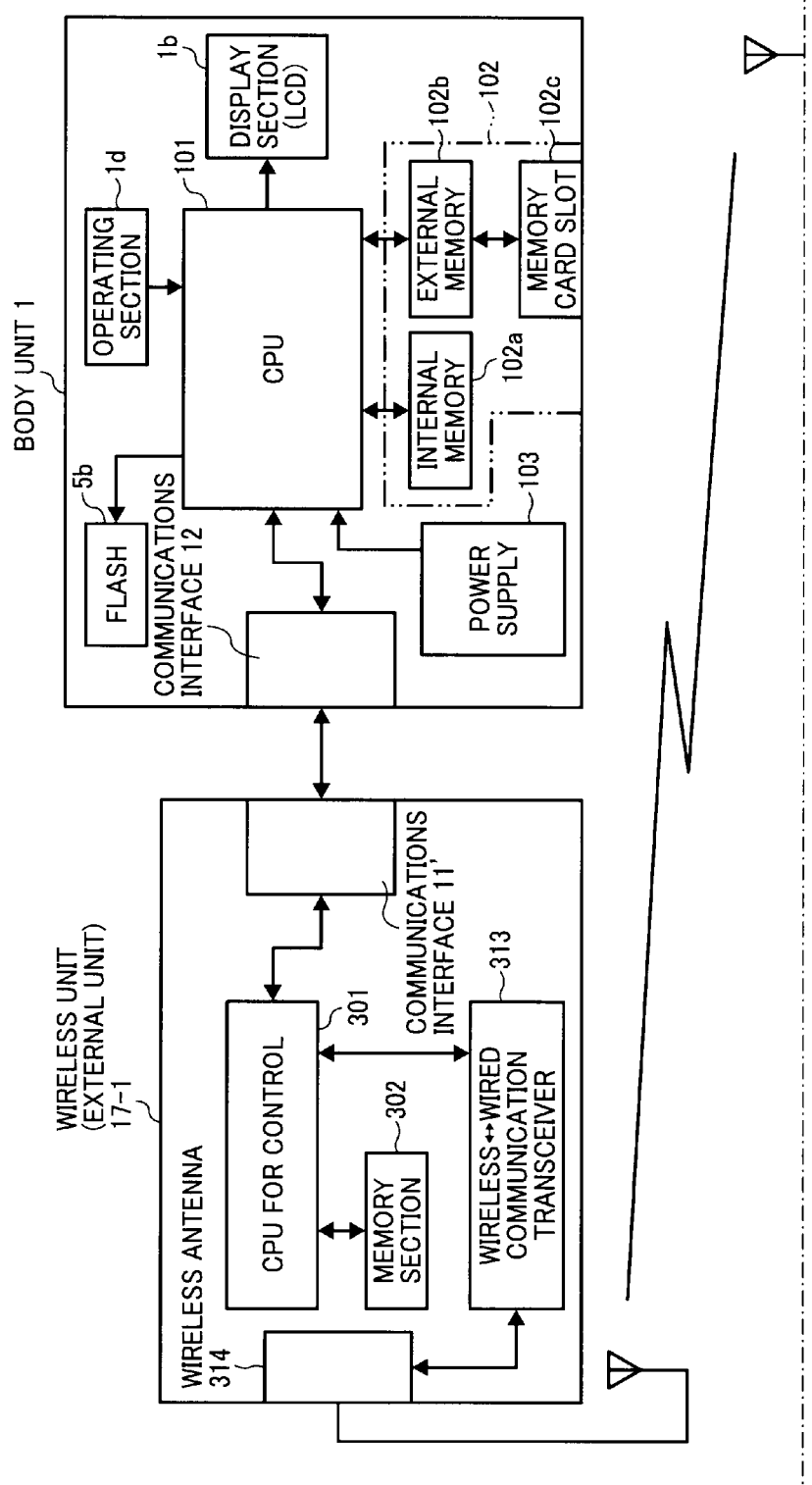
FIG. 6 is a block diagram illustrating a wireless waterproof camera unit of the imaging system in the embodiment.
Figure 6B:
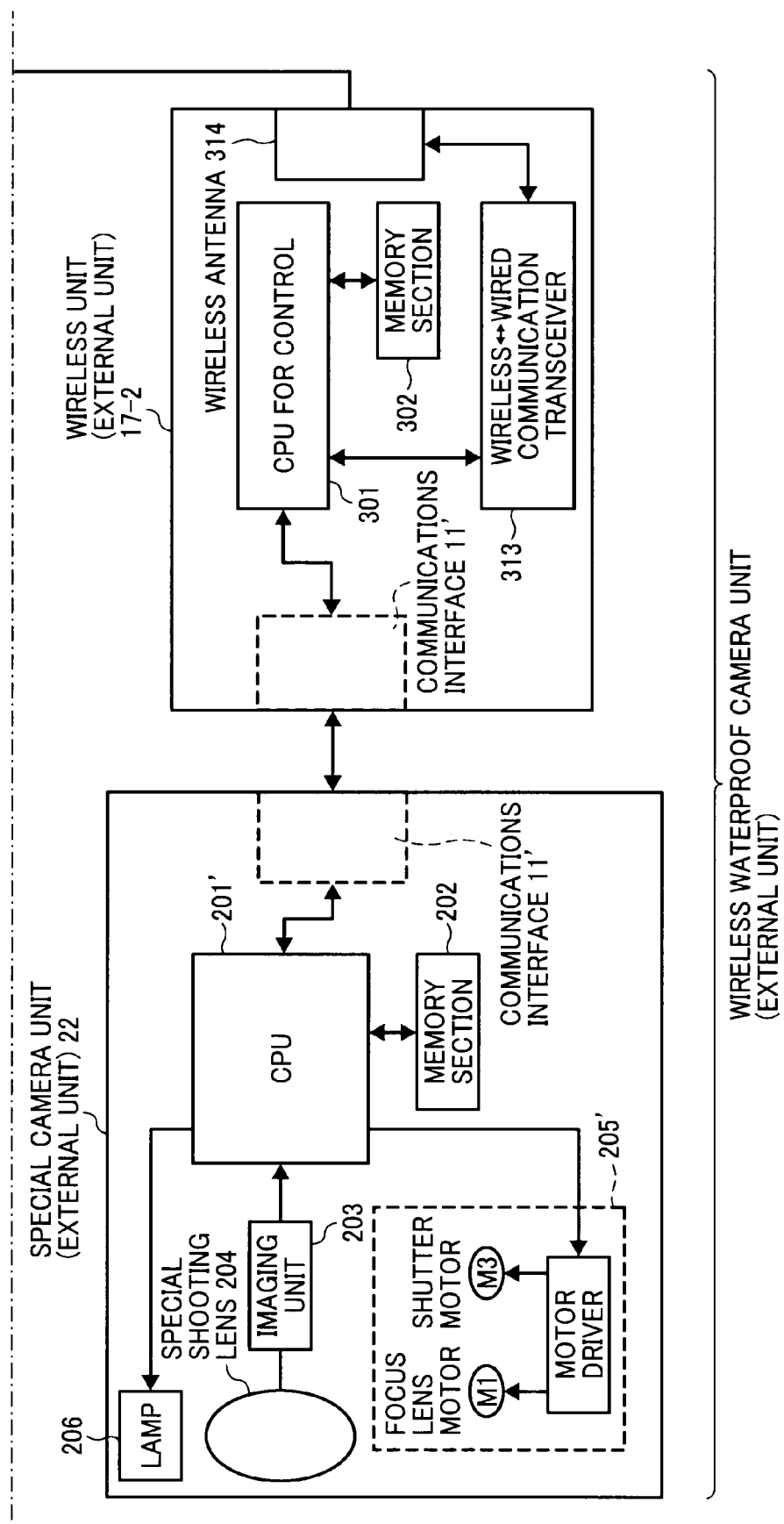

The wireless waterproof camera unit illustrated in FIG. 6 includes a wireless unit 17-1 which is connected to the body unit 1, a wireless unit 17-2 which performs an information communication with the wireless unit 17-1 by telecommunications, and a special camera unit 22 which is connected to the wireless unit 17-2 and performs a special shooting.

In this wireless waterproof camera unit, the body unit 1 and the special camera unit 22 similar to the interchangeable lens unit 2 (2') are connected via the wireless units 17-1 and 17-2, and regarding a shooting, an operation similar to that of the interchangeable lens unit 2 (2') is performed; therefore details will not be explained here.

In the above-described wireless waterproof camera unit, the special camera unit 22 and the wireless unit 17-2 have been described as separated units, however they can be an integrated unit.

Details of the constitutions of the wireless units 17-1 and 17-2 and the special camera unit 22 will not be explained here (although see FIG. 6).

And also, as to the adaptor unit for connecting the special optical system such as the fiberscope and so on, regarding the shooting, an operation similar to that of the interchangeable lens unit 2 (2') is performed; therefore details will not be explained here.

Additionally, in the imaging system according to the embodiment of the present invention, in the case where an external unit without a shooting function is connected to the body unit 1, the external unit (without the shooting function) operates as a master device of the entire device including the body unit 1 and the unit connected to the body unit 1, and the body unit 1 operates as a slave device.

As well as the interchangeable lens unit 2 (2'), each of all external units without the shooting function has a communications interface for connecting with the body unit 1.

Also in the case where the external unit without the shooting function is connected to the body unit 1, the body unit 1, in accordance with the communications protocol, performs a connection check between the body unit 1 and the external unit, a confirmation of a unit number of the external unit, and so on.

And the external unit (without the shooting function) connected to the body unit 1 operates as a master device for executing its function, and the body unit 1 operates as a slave device.

For example, in the case where the printer unit 15 as the external unit is connected to the body unit 1, the printer unit 15 becomes a master device and the body unit 1 becomes a slave device.

In accordance with a control command from the printer unit 15 as a master control, the body unit 1 reads out image data stored in the body unit 1, displays an image expressed by the image data on the display section 1*b*, displays an image selection menu for selecting the displayed image, detects an image selection operation of the operating section 1*d* or the switch icons of the display section 1*b* by a user, and then sends detected operation information to the printer unit 15.

When receiving operation information for executing a printing operation from the body unit 1, the printer unit 15 controls the printer mechanism 303 that feeds paper, prints an image, and so on, and executes the printing operation.

In particular, the selected image is printed on paper inserted in a paper insertion slot (not illustrated), and printed paper is ejected from a paper ejection slot 15*b* (see FIG. 4B).

FIG. 7 is a flowchart illustrating an operation of the body unit 1 regarding a change of a master control in the embodiment.

Here, an operation in the case where the power switch of the body unit 1 is turned on after the interchangeable lens unit 2 (2') or the external unit is connected to the body unit 1 will be explained.

In FIG. 7, when the power switch of the body unit 1 is turned on (S1), the body unit 1 supplies power to a unit connected to the body unit 1 (S2), and performs communication for performing a connection check (S3).

The connection check between the body unit 1 and the interchangeable lens unit 2 (2') or between the body unit 1 and the external unit is performed by checking whether a voltage level of each line of the above signals is high or low, for example.

However, in the embodiment, the connection check is performed by the body unit 1 in a manner such that the body unit 1 sends predetermined data to the unit connected to the body unit 1, and the connected unit sends back the predetermined data received from the body unit 1 to the body unit 1, and then the body unit 1 confirms whether the predetermined data sent from the body unit 1 (transmitted data) and the predetermined data sent back from the connected unit (received data) are matched or not.

In the above, the connected unit sends back the predetermined data received from the body unit 1; however inverted data in which the predetermined data is inverted can be also used.

Figure 8:
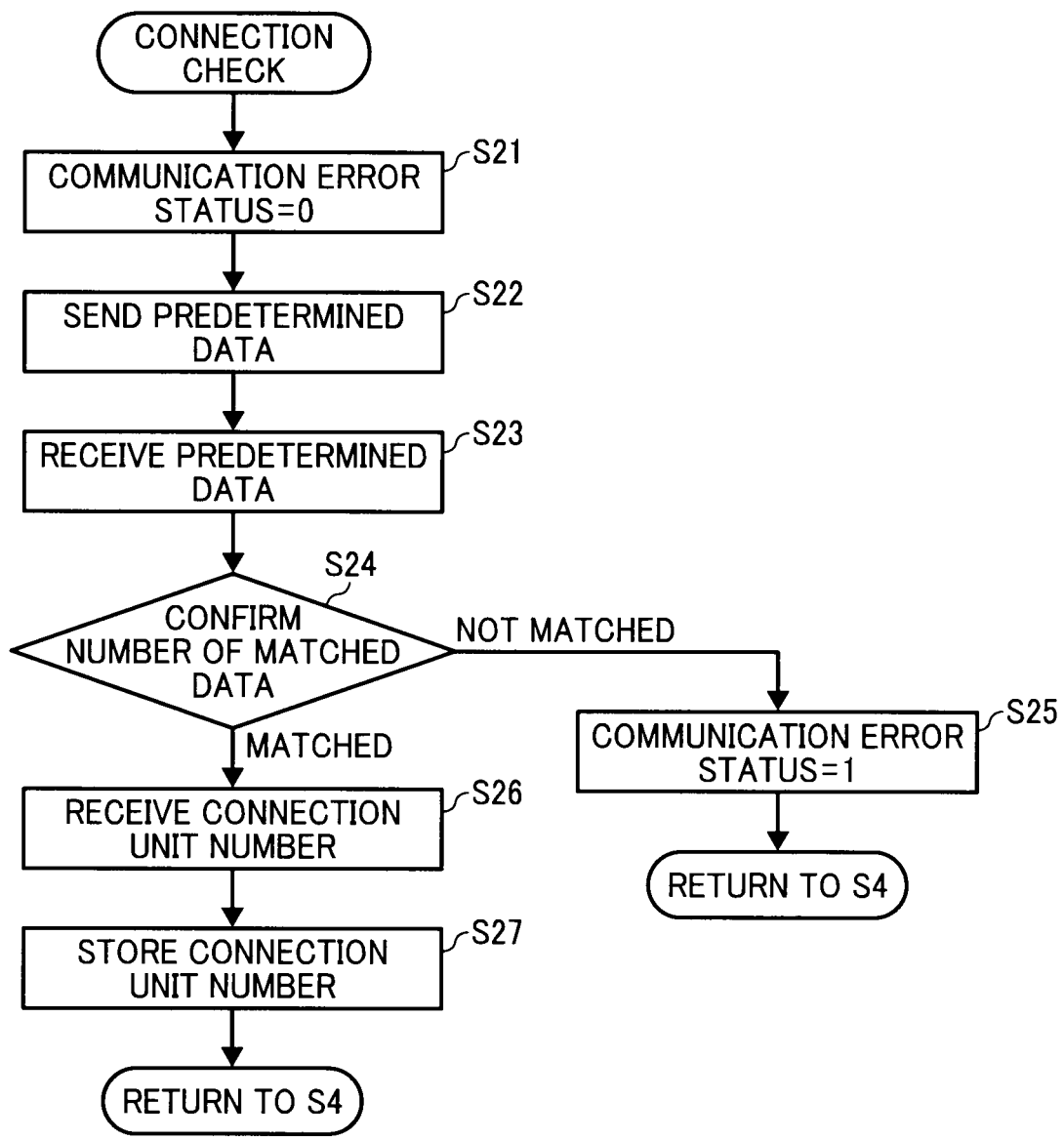
FIG. 8 is a flowchart illustrating a connection check process of the body unit in the embodiment.

FIG. 8 is a flowchart illustrating a process of the connection check of S3 illustrated in FIG. 7.

In the embodiment, a communication error status is defined as a flag (variable) which expresses whether a communication error exists or not between the body unit 1 and the connected unit on the program installed in the body unit 1.

The flag is set to "0" in the case where the transmitted data and the received data are completely matched, and the flag is set to "1" in the case where the transmitted data and the received data are not matched.

In particular, the body unit 1 firstly sets the communication error status to "0" (S21), and sends predetermined data to the connected unit (S22).

The body unit 1 receives predetermined data sent back from the connected unit (S23), and the body unit 1 confirms whether the predetermined data previously sent from the body unit 1 and the predetermined data sent back from the connected unit are completely matched or not by counting the number of matched data (S24).

Here, in the case where the transmitted data and the received data are not matched, the body unit 1 sets the communication error status to "1" (S25), and the process returns to S4 of FIG. 7.

In the case where the transmitted data and the received data are completely matched in S24, the body unit 1 receives data of a connection unit number which expresses a type of unit set beforehand for the connected unit (S26), and stores the data of the connection unit number in the body unit 1 (S27), and then the process returns to S4 of FIG. 7.

As illustrated in FIG. 7, the body unit 1 confirms the communication error status after the connection check of S3 (S4). And in the case where the communication error status is set to "1", a communication error occurs between the body unit 1 and the connected unit, and an entire device including the body unit 1 and the unit connected to the body unit 1 does not work. And accordingly, the body unit 1 displays indications that express a communication error has occurred, helps to retry a connection, and so on for a predetermined time (S5), and then automatically turns off (S6).

Even in the case where the interchangeable lens unit 2 (2') or the external unit is not connected to the body unit 1, the body unit 1 can display an image of image data stored in the external memory 102b or the memory card in the memory card slot 102c on the display section 1b as a stand-alone operation.

In this case, in place of the above S5, the body unit 1 needs to process an operation such as that of displaying options on the display section 1b in the case of performing the above stand-alone operation.

In S4, in the case where the communication error status is set to "0", the body unit 1 confirms the type of connected unit by the connection unit number stored in S27 (S7).

In the case where the connected unit is a unit which performs a shooting operation (unit with the shooting function) such as the interchangeable lens unit 2 (2') (No. 1), the wireless waterproof camera unit (No. 7), and the adaptor unit (No. 8), the body unit 1 executes a control program of the electronic still camera installed in the body unit 1 (S8).

And then, depending on whether an operation mode of the imaging device including the body unit 1 and the unit with the shooting function is a shooting mode or a playback mode (S9), in the case of the shooting mode, the imaging device performs a monitoring (live-preview) operation (S10), and in the case of the playback mode, the imaging device performs a playback operation (S11).

In S7, in the case where the connected unit is an external unit which is a unit without a shooting function (any one of No. 2 to No. 6), the body unit 1 reads out and executes a control program for working as a slave device from the memory section 102 (S12), and enters a waiting state to receive a control command from the external unit (master device) (S13).

In the above explanation, an operation when the power of the body unit 1 is on after the interchangeable lens unit 2 (2') or the external unit is connected to the body unit 1 has been explained; however the body unit 1 can detect a connection (change) by a switch or the like when any one of units is connected to the body unit 1 and the connected unit is changed.

Figure 9:
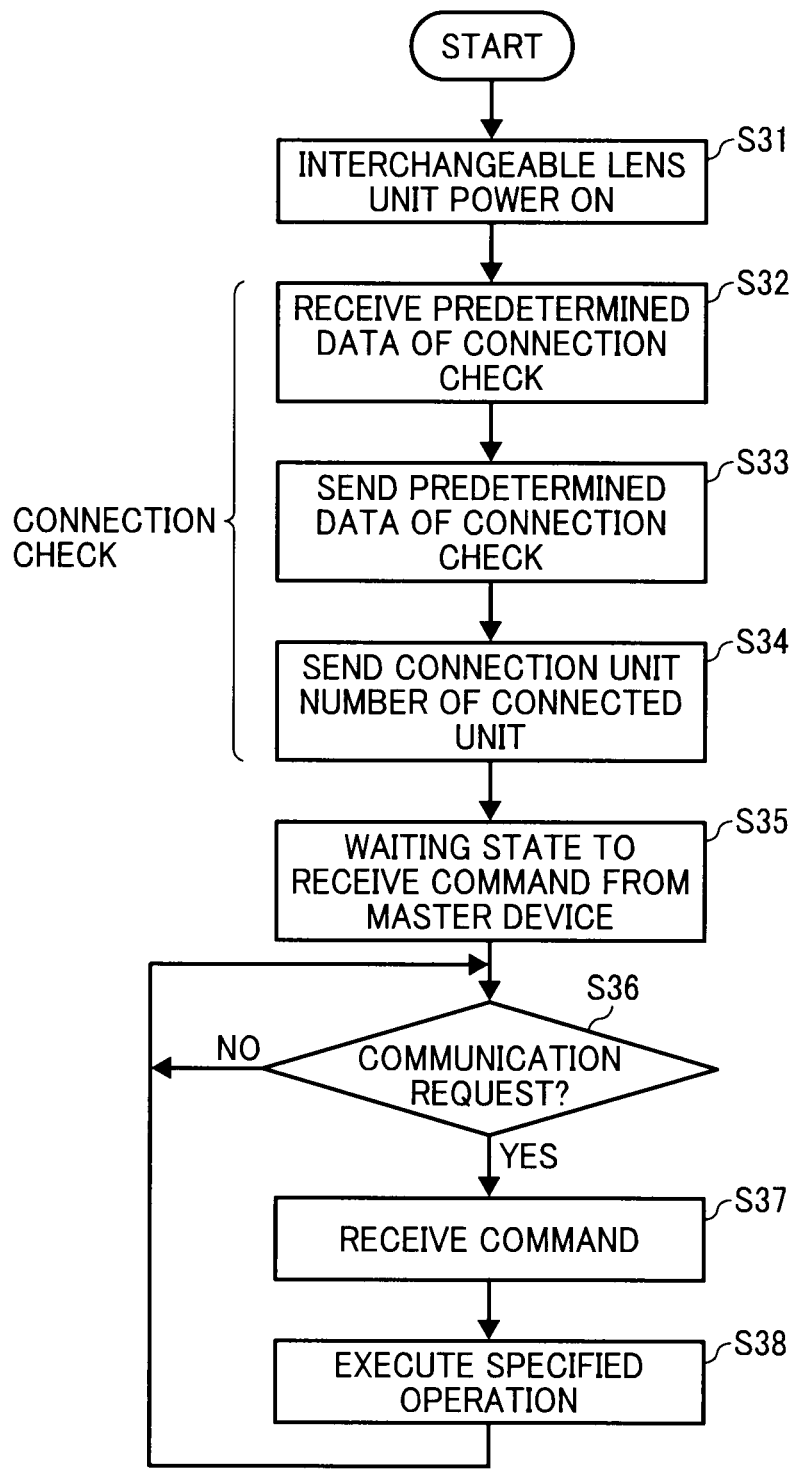
FIG. 9 is a flowchart illustrating an operation of the interchangeable lens unit connecting to the body unit in the embodiment.

Next, FIG. 9 is a flowchart illustrating an operation of the interchangeable lens unit 2 (2') connected to the body unit 1.

After the power is supplied by the body unit 1 by S2 of FIG. 7 and the power of the interchangeable lens unit 2 (2') is on (S31), the interchangeable lens unit 2 (2') receives predetermined data sent from the body unit 1 by communication of the connection check performed by the body unit 1 (S32), and sends back the predetermined data (S33).

And then, the interchangeable lens unit 2 (2') sends its own connection unit number (No. 1) set beforehand as illustrated in a table of connection unit numbers of FIG. 7 (S34).

The interchangeable lens unit 2 (2') enters a waiting state (slave mode) to receive a command from the body unit 1 (master device) (S35), and in the case where there is a communication request from the body unit 1 (Yes of S36), the interchangeable lens unit 2 (2') receives a control command from the body unit 1 (S37), and in the case where there is no communication request from the body unit 1 (No of S36), the operation returns to S36.

Depending on the received control command, the interchangeable lens unit 2 (2') performs, for example, an operation of a camera regarding imaging, and executes a specified operation such as sending imaged data to the body unit 1, and then the operation returns to S36 (S38).

Next, FIG. 10 is a flow chart illustrating an operation of the external unit without the shooting function connected to the body unit 1.

The power is supplied by the body unit 1 by S2 of FIG. 7, and then after the power of the external unit is on (S41), the external unit receives predetermined data sent from the body unit 1 by communication of the connection check performed by the body unit 1 (S42), and sends back the predetermined data (S43).

And then, the external unit sends its own connection unit number set beforehand (for example, No. 3, when the external unit is the printer unit 15), as illustrated in the table of connection unit numbers of FIG. 7 (S44).

In the body unit 1, S4, S7, S12, and S13 of the flowchart illustrated in FIG. 7 are performed, and the body unit 1 enters a waiting state (slave mode) to receive a command from the external unit connected to the body unit 1.

Accordingly, the external unit connected to the body unit 1 operates as a master device of an entire device including the body unit 1 and the external unit connected to the body unit 1.

The external unit (master device) sends a communication request to the body unit 1 (slave device) (S45), and continuously sends a command to detect a state of the switches (S46).

The external unit firstly detects an operation state of the operation switches of the operating section 1d of the body unit 1.

Figure 5:
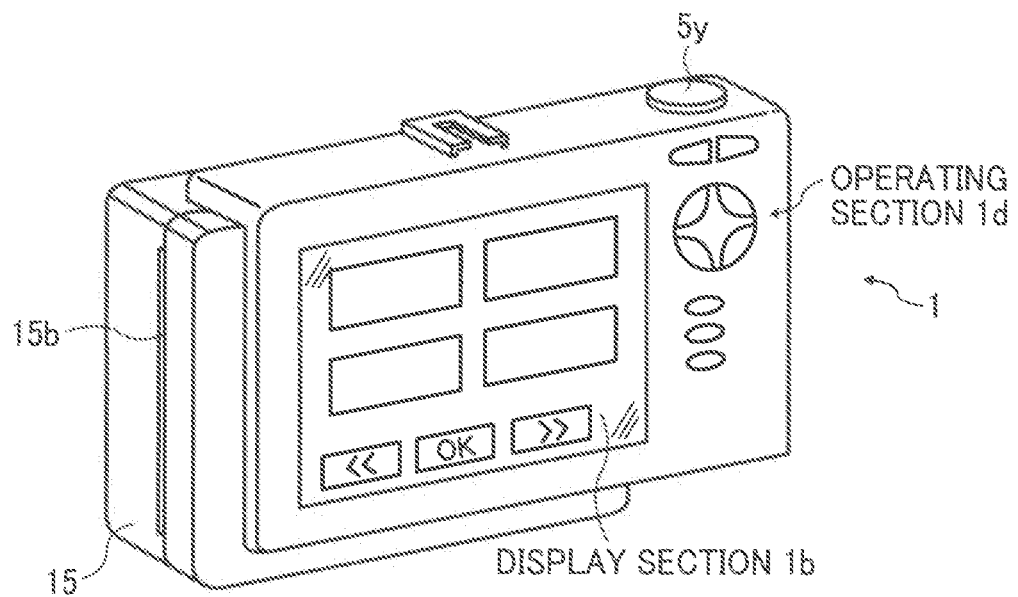
FIG. 5 is a perspective view seen from the back illustrating switches and switch icons for operation and display of the imaging system in the embodiment.

And in the case where the display section 1b has the touchscreen function, the external unit detects an operation state of the switch icons displayed on the display section 1b (see FIG. 5).

An assignment of functions to each switch of the operation switches and an assignment of a display of the switch icons to the display section 1b are included in an operation of sending the command to detect the state of the switches (S46 of FIG. 10).

In particular, the external unit observes a change of a state of each of the switches (S47), and if there is a change of an operation state of a switch (Yes of S47), the external unit executes a predetermined operation corresponding to the operation state of the switch (S48).

And if there is a display change accompanied with the predetermined operation, the external unit changes a state of the display section 1b (LCD) of the body unit 1 by sending a communication request (S49), and continuously sending a command for the display change (S50).

The external unit confirms whether the predetermined operation corresponding to the operation state of the switch ends or not (S51). If the predetermined operation does not end (No of S51), the operation returns to S48, and the external unit executes the following operations (S49, S50, and S51), and if the predetermined operation ends (Yes of S51), the operation returns to S47, and the external unit confirms a next operation of the switches (next operation instruction by a user).

In S47, if there is no operation of the switches (No of S47), the external unit sends a communication request to the body unit 1 (S52), and receives operation information which expresses the operation of the switches (S53).

And in S47, until there is an operation of the switches, the external unit repeats S47, S52, and S53.

Thus, the external unit connected to the body unit 1 and the body unit 1 become integrated, so that the function of the external unit (for example, the printer function) is implemented.

Incidentally, if there is an imaging system in which a control program for controlling an external unit is installed in a body unit, and in the case where a new product of the external unit is brought onto the market, in such an imaging system as the above, there may be a possibility of the need to add a change to the control program for controlling the external unit installed in the body unit in order to ensure compatibility between the external unit and the body unit.

A change of the control program as described above, for example, is performed in a manner such that the body unit is connected to a PC and the like; therefore, generally, this involves additional work for a user.

On the other hand, in the imaging system according to the embodiment of the present invention, as to the external unit without the shooting function, the external unit has the control program for controlling the external unit, and therefore it is not necessary to add a change to the control program installed in the body unit 1.

And additionally, as to the interchangeable lens unit 2 (2') and the external unit with the shooting function, a shooting operation of those units is common; therefore if a control program for controlling those units is installed in the body unit 1, it is not necessary to add a change to the control program.

Each of the external units without the shooting function (master device) has a control program for controlling each function section (for example, the printer mechanism 303 and so on), and a role of each of the switches of the body unit 1 is set per external unit connected to the body unit 1 by the control program.

And additionally, by the control program, it is possible to display an operation menu, progress of an operation, and a result of the operation on the display section 1b (LCD) of the body unit 1, and store data such as image data in the memory section 102 of the body unit 1 and the like.

External units connected to the body unit 1 are not limited to the specifically above-described external units.

According to the above-described embodiment, the body unit 1 obtains information on the type of unit connected to the body unit 1, and is capable of changing a control of an entire device including the body unit 1 and the unit connected to the body unit 1 based on the type of unit connected to the body unit 1; therefore it is possible to execute a specific function of the unit connected to the body unit 1.

Additionally, the body unit 1 is capable of processing image data obtained by a unit with a shooting function including the interchangeable lens unit 2 (2'), and has a function of displaying and storing processed image data, and therefore in the case where a unit connected to the body unit 1 is the unit with the shooting function including the interchangeable lens unit 2 (2'), a controller of the body unit 1 serves a control of an entire device including the body unit 1 and the unit connected to the body unit 1, and thereby it is possible to effectively implement a function as an imaging device (entire device).

Moreover, an external unit has a function section for implementing a specific function of the external unit, a controller which is capable of controlling an entire device including the body unit 1 and the external unit, a memory section which stores program data for implementing the specific function of the external unit, and a communications section which transfers information between the body unit 1 and the external unit, and therefore in the case where a unit connected to the body unit 1 is an external unit without a shooting function, it is possible for a controller of the external unit to serve a control of an entire device including the body unit 1 and the external unit, and the entire device effectively implements a specific function of the external unit.

And furthermore, in the case where the external unit serves the control of the entire device including the body unit 1 and the external unit, depending on a control command sent from the external unit, the body unit 1 serves only a function as a user interface which implements at least one of an operation of sending an input result of an operation by a user, an operation of displaying information received from the external unit on the display section 1b, and an operation of writing or reading out the information received from the external unit on or from the memory section 102, and therefore the body unit 1 does not need to have an unnecessary control program installed in the body unit 1, and it is possible to reduce a memory amount for installing the program.

And it is possible to reduce costs of a function of an external unit that a user (customer) does not use, a program for controlling a user interface of the function, and a memory section for a necessary memory amount for installing the program.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging system comprising:
    a body unit;
    at least one type of interchangeable lens unit; and
    at least one type of external unit, wherein
    in the case where the body unit and one of the at least one type of interchangeable lens unit are connected integrally, the imaging system becomes an imaging device configured to shoot a photographic subject, and in the case where the body unit and one of the at least one type of external unit are connected integrally, the imaging system becomes a device having a specific function of the external unit connected to the body unit,
    when the interchangeable lens unit or the external unit is connected to the body unit, the body unit obtains information on a type of a unit connected to the body unit, and is configured to change a control of an entire device including the body unit and the unit connected to the body unit based on the type of the unit connected to the body unit,
    the body unit includes an operating section and a display section,
    in a case where an external unit without a shooting function is connected to the body unit, the external unit becomes a master device, and the operating section and the display section of the body unit is used as a user interface,
    the operating section detects an input operation by a user,
    the display section is configured to display an image expressed by processed image data,
    the body unit has:
        a first controller which is configured to process the image data and control the imaging system;
        a first memory section which is configured to store program data which implements a function of the imaging device and image data; and
        a first communications section which transfers information containing image data between the body unit and the interchangeable lens unit connected to the body unit or between the body unit and the external unit connected to the body unit,
    the interchangeable lens unit has:
        an imaging section which images a photographic subject and converts it to image data;
        a second controller which is configured to process the image data;
        a second memory section which is configured to store the image data imaged and converted by the imaging section; and
        a second communications section which transfers information containing the processed image data between the body unit and the interchangeable lens unit, and
    the external unit has:
        a function section which implements a specific function of the external unit;
        a third controller which is configured to control the imaging system;
        a third memory section which stores program data for implementing the specific function of the external unit; and
        a third communications section which transfers information between the body unit and the external unit, and
    when the interchangeable lens unit or the external unit is connected to the body unit via each of the communications sections, the body unit obtains information on the type of the unit connected to the body unit, and in the case where the unit connected to the body unit is the interchangeable lens unit or an external unit with a shooting function of the at least one type of external unit, the controller of the body unit serves a control of the entire device including the body unit and the unit connected to the body unit, and in the case where the unit connected to the body unit is an external unit without a shooting function of the at least one type of external unit, the controller of the external unit serves a control of an entire device including the body unit and the external unit.

2. The imaging system according to claim 1, wherein in the case where the external unit serves the control of the entire device including the body unit and the external unit, depending on a control command sent from the external unit, the body unit serves only a function as the user interface which implements at least one of an operation of sending an input result of the operating section by the user, an operation of displaying information received from the external unit on the display section, and an operation of writing or reading out the information received from the external unit on or from the first memory section.

3. The imaging system according to claim 1, wherein the external unit with the shooting function is an adaptor unit for connecting a special optical system.

4. The imaging system according to claim 1, wherein the external unit with the shooting function has a telecommunications function which is configured to communicate with the body unit by wireless or wired communication.

5. The imaging system according to claim 1, wherein the external unit without the shooting function of the at least one type of the external unit is any one of an external memory unit which extends a memory capacity of the first memory section of the body unit, a printer unit which prints the image data, a projector unit which projects and displays the image data, a scanner unit which scans an image and converts it to image data, and an interface unit which is configured to transfer the image data between a peripheral device and the external unit.

6. The imaging system according to claim 1, wherein the first controller controls the imaging system when control of the entire device is changed in favor of the body unit.

7. The imaging system according to claim 1, wherein the third controller controls the imaging system when control of the entire device is changed in favor of the external unit.

8. The imaging system according to claim 1, wherein
    the first controller controls the imaging system when control of the entire device is changed in favor of the body unit, and
    the third controller controls the imaging system when control of the entire device is changed in favor of the external unit.

9. The imaging system according to claim 1, wherein change of the control of the entire device includes switching either the body unit or the external unit to operate as a master device which controls the entire device, depending on the type of the unit connected to the body unit.

10. The imaging system according to claim 9, wherein change of the control of the entire device includes switching the other of the body unit or the external unit to operate as a slave device controlled by the master device.

11. The imaging system according to claim 1, wherein the external unit without the shooting function includes at least one type of external unit including one of a printer unit which prints image data, a projector unit which projects and displays image data, and a scanner unit which scans an image and converts it to image data.

* * * * *